United States Patent [19]

Shimazaki et al.

[11] Patent Number: 4,792,847
[45] Date of Patent: Dec. 20, 1988

[54] METHOD FOR AUTOMATICALLY SETTING SIGNAL PROCESSING CONDITIONS IN IMAGE INPUT/OUTPUT SYSTEM

[75] Inventors: Osamu Shimazaki; Hitoshi Urabe; Takao Shigaki, all of Kaisei, Japan

[73] Assignee: Fuji Photo Film Co., Ltd., Kanagawa, Japan

[21] Appl. No.: 924,818

[22] Filed: Oct. 30, 1986

[30] Foreign Application Priority Data

Nov. 9, 1985 [JP] Japan ................................ 60-251571

[51] Int. Cl.[4] .......................... H04N 1/40; H04N 1/46
[52] U.S. Cl. ......................................... 358/80; 358/75
[58] Field of Search ............................. 358/80, 75, 76

[56] References Cited

U.S. PATENT DOCUMENTS

| | | | |
|---|---|---|---|
| 4,037,249 | 7/1977 | Pugsley | 358/80 |
| 4,300,158 | 11/1981 | Morgenfruh et al. | 358/80 |
| 4,410,909 | 10/1983 | Ueda et al. | 358/80 |
| 4,591,904 | 5/1986 | Urabe et al. | 358/75 |

Primary Examiner—James J. Groody
Assistant Examiner—Robert M. Bauer
Attorney, Agent, or Firm—Wenderoth, Lind & Ponack

[57] ABSTRACT

A method for automatically setting signal processing conditions for respective colors in an image input/output system where a color original is read for color separation by an image input device and input density signals from the input device are then inputted to a signal processing section to be processed in gradation for each color. Then, the process density signals are inputted to an image output device such that the conditions of the original in the form of optional parameters are selected from a set of options and characteristic point parameters which are selected by designating characteristic points on the original to be processed are selected as auxiliary input parameters. Prescanned data from the image input device is processed together with the auxiliary input parameters so as to thereby determine the processing conditions for respective color output density signals.

11 Claims, 10 Drawing Sheets

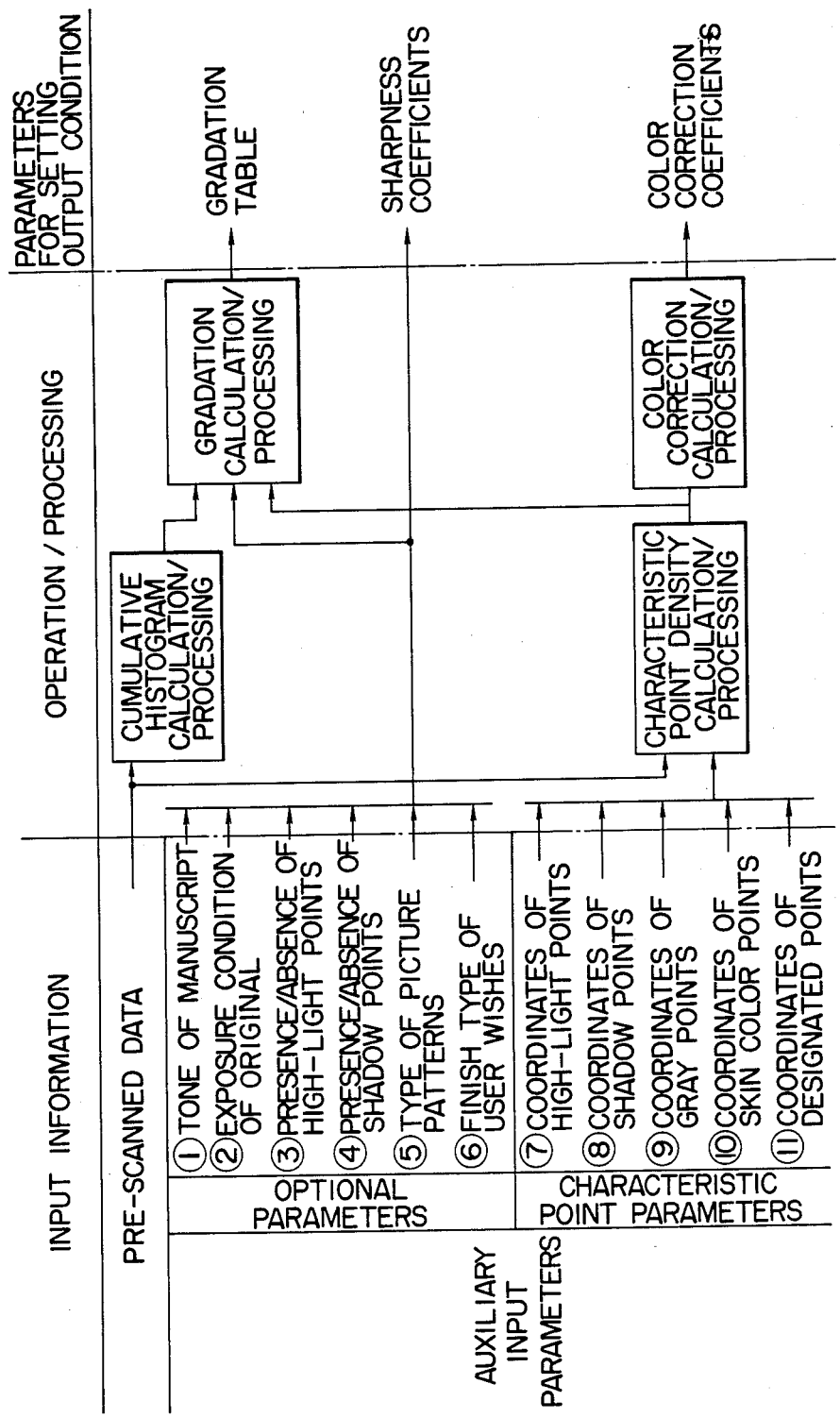
F I G. 2

FIG. 7

| SELECTIVE ITEMS / PICTURE PATTERN | COLOR CORRECTION | SHARPNESS INTENSITY | AMOUNT OF UCR & BLACK PRINT |
|---|---|---|---|
| PERSON (S) | SATURATIONS OF Y AND R → HIGH | SLIGHTLY LOW | AMOUNT OF UCR → LITTLE |
| MACHINE (S) | SATURATION → LOW | SLIGHTLY HIGH | AMOUNT OF UCR & BLACK PRINT → MUCH |
| ⋮ | ⋮ | ⋮ | ⋮ |

FIG. 8

| PARAMETERS | SELECTIVE POINT |
|---|---|
| TONE | LIGHT / STANDARD / DARK |
| COLOR | SATURATION HIGH / STANDARD / SATURATION LOW |
| SHARPNESS | HIGH / STANDARD / LOW |
| UCR | LITTLE / STANDARD / MUCH |
| ⋮ | ⋮ |

FIG.10

| | OPTIONAL PARAMETERS | CHARACTERISTIC POINT PARAMETERS | ORIGINAL TO BE SUBJECTED |
|---|---|---|---|
| LEVEL 0 | — | — | ORIGINAL OF NORMAL TONE, NORMAL EXPOSURE |
| LEVEL 1 | ○ | — | ORIGINAL HAVING NO HIGH-KEY/LOW-KEY, UNDER-/OVER-EXPOSURE, HIGH-LIGHT/SHADOW POINT |
| LEVEL 2 | ○ | ○ | ORIGINAL HAVING COLOR FOGGING, CATCH LIGHT |

FIG.11

| | QUALITY | PRODUCTIVITY |
|---|---|---|
| LEVEL 0 | △ | ◎ |
| LEVEL 1 | ○ | ○ |
| LEVEL 2 | ◎ | △ |

◎ : ESPECIALLY GOOD
○ : GOOD
△ : NORMAL

FIG. 13

(A)
```
      LEVEL  CHOICE ?
  1.  LEVEL  0
  2.  LEVEL  1
  3.  LEVEL  2
```

(B)
```
1. KEY ?
    ( 1.HIGH  2.NORMAL  3.LOW )
2. CONDITION ?
    ( 1.UNDER  2.NORMAL  3.OVER )
3.
```

(C)
```
1. HIGH-LIGHT POINT ?
2. SHADOW POINT ?
```

METHOD FOR AUTOMATICALLY SETTING SIGNAL PROCESSING CONDITIONS IN IMAGE INPUT/OUTPUT SYSTEM

BACKGROUND OF THE INVENTION

This invention relates to a method for automatically setting signal processing conditions so as to obtain finished images in a desired manner in a color image input/output system.

In a color image input/output system is generally employed a method of reading color originals for color separation by an image input device (e.g. color scanner), processing such input density signals of respective colors from the device in gradation, and inputting thus processed density signals of respective colors into an image output device (e.g. laser color printer). More specifically, input density signals are processed by using a density histogram prepared with pixel data to determine the highlight density, shadow density and gradation conversion curves in the system. The gradation conversion curves are set generally based upon the concept of unifying density histogram values in output images thereby to incapacitate faithful reproduction of the images of the original. For instance, the images which are in high-key or low-key in the original come out in normal tone in the output images. Moreover, it is difficult to automatically set high-light density when the original has a relatively large catch light point or has no high-light points. Mistakes are often caused in such a case. It is difficult to set gradation for retouching color fogging or other defects.

SUMMARY OF THE INVENTION

This invention was contrived to obliterate above mentioned problems encountered in the prior art and aims to provide a method for automatically setting signal processing conditions for output signal processing in an image input/output system which can sufficiently deal with color originals having various conditions and which can produce image output at a higher precision. According to one aspect of this invention, for achieving the primary object described above and another object, there is provided a method for automatically setting signal processing conditions for respective colors in an image input/output system where a color original is read for color separation by an image input device, input density signals from the input device are inputted to a signal processing section to be processed in gradation for each color, and then the processed density signals are inputted to an image output device, which is characterized in that conditions of said original are selected as auxiliary input parameters for each original in the form of optional parameters which are selected from a set of options and/or of characteristic point parameters which are selected by designating characteristic points on the original to be processed, and pre-scanned data from said image input device are processed together with the auxiliary input parameters.

The nature, principle and utility of the invention will become more apparent from the following detailed description when read in conjunction with the accompanying drawings.

BRIEF DESCRIPTION OF THE DRAWINGS

In the accompanying drawings:

FIG. 2 is a block diagram to show the method for generating parameters for setting conditions in image processing;

FIG. 7 is a table to show an example of the types of picture;

FIG. 8 is a table to show an example of the desired finish by a user;

FIG. 10 is a table to show an example of classification by levels;

FIG. 11 is a graph to show features of levels;

FIG. 13 is an example of multiple choices used in selection of finish.

DETAILED DESCRIPTION OF THE PREFERRED EMBODIMENT

Figure 1:
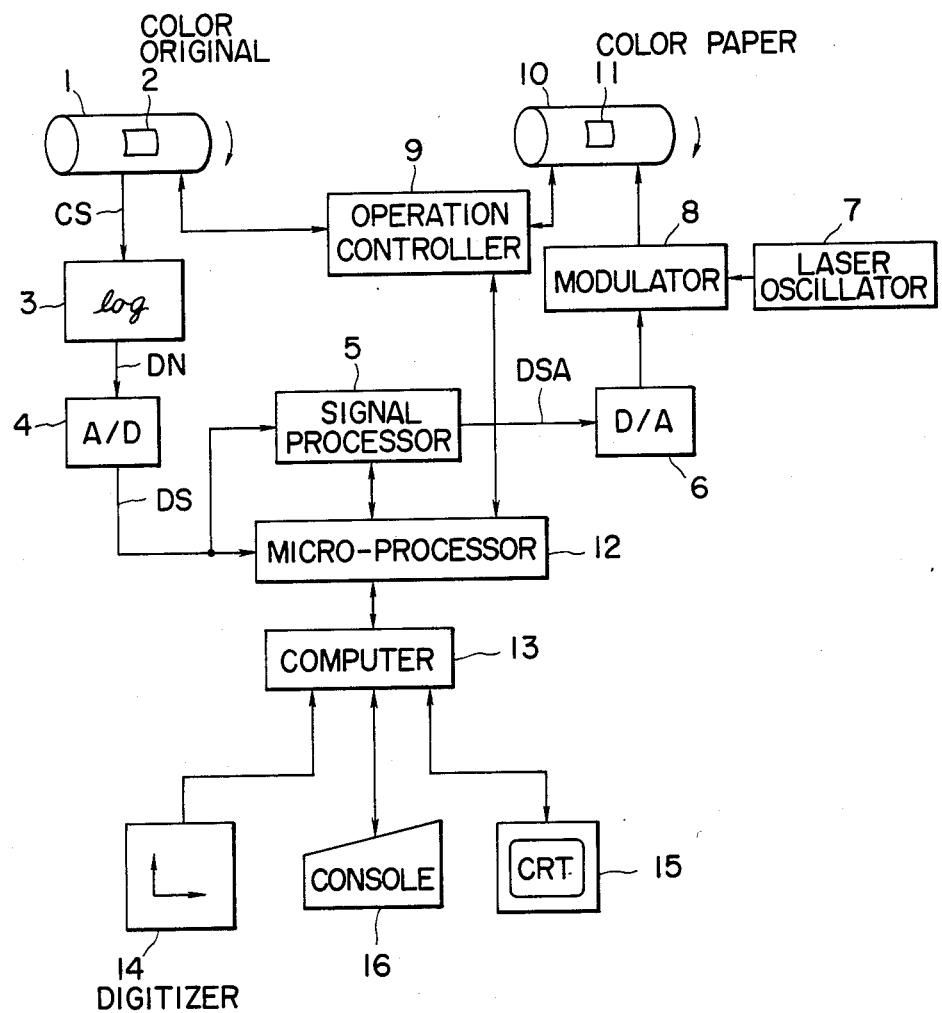
FIG. 1 is a block diagram of an embodiment of the device to which this invention method is applicable.

FIG. 1 is a block diagram to show an embodiment of an image input/output system which realizes this invention method. In the figure, a color original 2 pasted on a rotating input drum 1 is processed in accordance with the information inputted in graphic patterns from a graphic input device such as a digitizer 14 so as to output the original in images on a recording material such as color paper 11 pasted on a rotating output drum 10. The color original 2 is color separated by a reading head (not shown) to read image information therefrom, and thus obtained color separation signals CS are inputted into a logarithmic conversion circuit 3. The signals converted into density signals DN by the logarithmic conversion circuit 3 are further converted into digital signals DS by an A/D converter 4. The digital signals DS are inputted into a signal processor 5 and a microprocessor 12. They are processed in color, sharpness and gradation by the signal processor 5 to become image information DSA. The image information DSA is converted into analog signals by an A/D converter 6, inputted into a mudulator 8 within a laser beam printer so as to modulate the laser beams from a laser oscillator 7 to expose a sheet of the color paper 11 pasted on the output drum 10 via an output head (not shown).

A console 16 having a key board as a device for inputting data and commands is provided separately. The data inputted from the console 16 are inputted into a computer 13. The data processed by the computer 13 are displayed on a graphic display 15 of a dialogue type. The computer 13 is connected to the micro-processor 12 of a downstream system. The micro-processor 12 receives density signals DS from the A/D converter 4, and is further connected to the signal processor 5 for arithmetic operation. The computer 13 and the micro-processor 12 form a computer system to display instructions for operators on the graphic display 15 in accordance with the program housed therein. The positions of the input drum 1 and of the output drum 10 are detected by a detector (not shown), and the data on their positions are inputted to an operation controller 9 which is connected to the micro-processor 12 in order to control the relatively position between two drum 1 and 10 when driven. The digitizer 14 has its own origin and X and Y axes, but can move the origin to an arbitrary point or rotate the coordinates easily by processing the signals. The positions of images on the digitizer 14 and the input drum 1 can be corresponded with plural guide pins provided on common positions. The digitizer 14 is connected to the computer 13 for inputting shapes of images or desired coordinates therein.

Explanation will now be given to the method for automatic setting of the signal processing conditions for processing such as gradation, sharpness and color correction according to this invention.

FIG. 2 is a block diagram to show the method for generating parameters in setting signal processing conditions for image processing. In order to perform automatic setting, pre-scanned data on the input color original 2 and auxiliary input parameters are used. The auxiliary input parameters can be classified into two: i.e. optional parameters for whole image of the color original 2 and characteristic point parameters for remarkable features thereof. Items used for the optional parameters are; ① tone of the original, ② exposure condition of the original, ③ presence/absence of high-light points (HP), ④ presence/absence of shadow points (SP), ⑤ type of picture patterns, and ⑥ finish type of the user wishes. Items used for the characteristics point parameters are; ⑦ coordinates of the high-light points, ⑧ coordinates of the shadow points, ⑨ coordinates of gray points, ⑩ coordinates of skin color points and ⑪ coordinates of color designated points. These items ① to ⑪ will be described in more detail hereinafter. Parameters of the input color original 2 are first set by selecting the optional item ① to ⑥ according to the preference of the user, and the information is processed in gradation operation. The prescanned pixel data of the input color original 2 are pocessed in cumulative histogram, and the result is also operated and processed in gradation. Then, characteristics of the input color original are inputted by selecting the items ⑦ to ⑪ in the characteristic point parameters, and the data are processed in density of the characteristic points. Pre-scanned data thereof are also inputted in the unit of a pixel, and calculated and processed in characteristic point density. The result is processed in color correction as well as in gradation. A gradation table is automatically set in accordance with the result of the gradation calculation processing, color correction coefficients are automatically set in accordance with the result of color correction calculation processing and sharpness coefficients in accordance with the optional parameters as the output conditions, respectively.

The auxiliary input parameters are the input information necessary for setting the parameters of the output conditions. They will now be described in more detal.

Figure 3A:
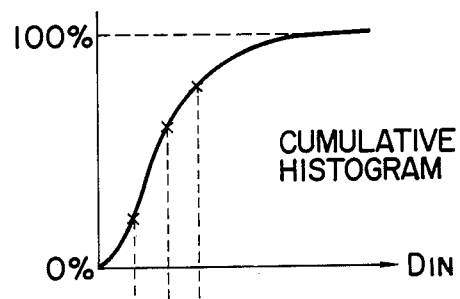
FIGS. 3A through 3C are graphs illustrating setting conditions for a particular tone gradation of an original.
Figure 3B:
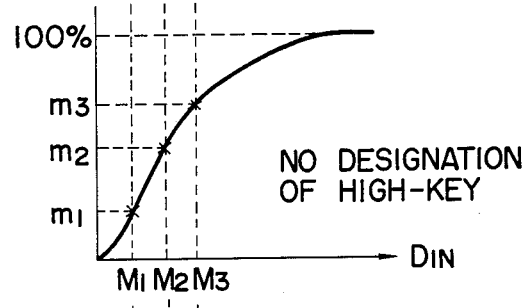
Figure 3C:
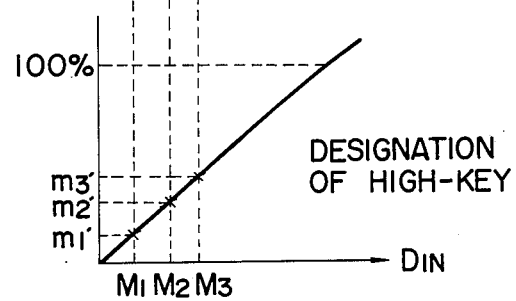
Figure 4A:
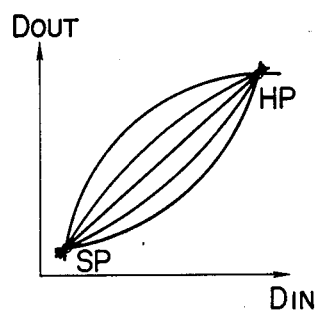
FIGS. 4A through 4D are graphs illustrating an example of setting signal processing conditions for a particular exposure of the original.
Figure 4B:
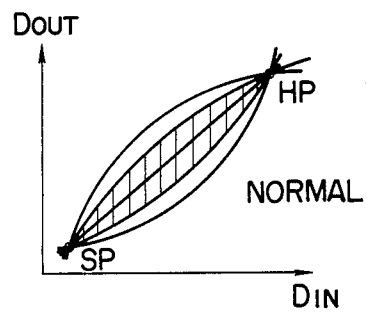
Figure 4C:
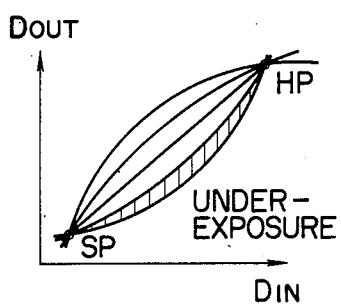
Figure 4D:
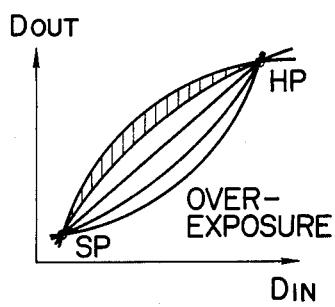

FIGS. 3A through 3C are graphs to show an example of the method of setting the item ①, tone of the original, FIG. 3A is a cumulative histogram of the input color original. If it is assumed that the input color original is to be corrected in gradation, but high-key is not designated, then the reproduced images will have distorted color tone as shown in FIG. 3B. If a high-key is designated for the item ① for the same original, as shown in FIG. 3C, the figures at the desired densities at the points $M_1$, $M_2$ and $M_3$ will be changed to have the density distributions of $m_1 > m_1'$, $m_2 > m_2'$, $m_3 > m_3'$. By designating high key, the tone of the color original is not excessively changed, but it is reproduced in a natural manner. For setting the parameter for the item ②, the exposure condition of the color original, one selects one of the input/output density curves as shown in FIGS. 4A through 4D. FIG. 4A shows several density curves which are already prepared. Depending on the exposure condition of a particular input color original, one chooses one of the curves of normal, under-exposure and over-exposure in FIGS. B, C and D. Errors can be prevented by referring to FIG. 4A in selecting one curve.

Figure 5A:
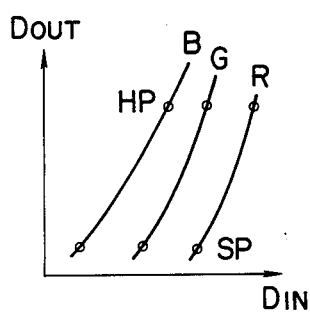
FIGS. 5A and 5B are graphs illustrating setting signal processing conditions for presence/absence of highlight points.
Figure 5B:
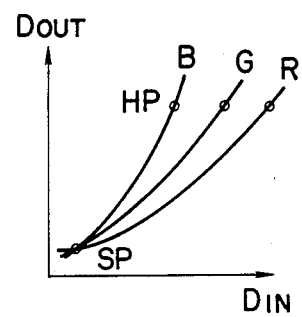
Figure 6A:
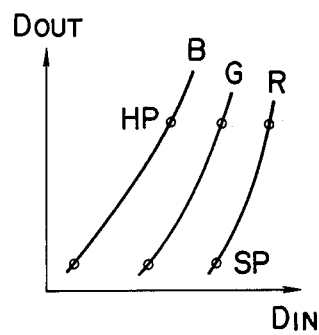
FIGS. 6A and 6B are graphs illustrating setting signal processing conditions for presence/absence of shadow points.
Figure 6B:
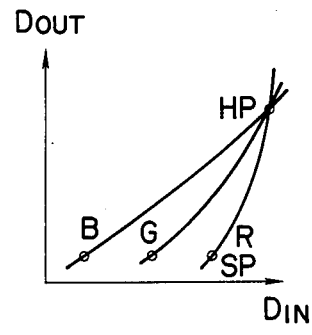

The item ③ is related to presence/absence of high-light points (HP). As shown in FIGS. 5A and 5B, an input/output density curve is selected depending on presence/absence of the high-light points HP. FIG. 5A shows an example where a high-light point HP exists, and therefore the provisional density set with the cumulative histogram is used without changes. FIG. 5B shows another example where no high-light points exists and the minimum densities are selected for B, G and R colors. In other words, if high-light points exist, one wishes to finish it whitish by retouching color-fogged points while if high-light points do not exist, one wishes to reproduce the tone of the high-light faithfully. Any color original can be dealt optimally by selecting or designating parameters this way. The item ④, presence/absence of the shadow points, relates to the situation opposite to the above item ③. FIG. 6A shows an example where a shadow point SP exists, and therefore the density provisionally set by the cumulative histogram is used without modification. In other words, one uses the density without changes if one wishes to finish it sheet black. FIG. 6B shows an example where shadow points do not exist, and the maximum densities are designated for R, G and B colors. If shadow points do not exist, the color original has the color tone, and therefore densities to express the color tone are designated. FIG. 7 shows an example of the item ⑤, type of the picture pattern, where the color correction coefficients (intensity) and the gradation table (in this case especially percentage of dots in each color or UCR (Under Color Removal) and percentage of dots in black print) are designated depending on the type of picture of the input color original. As shown in FIG. 7, if the picture is of a person(s), colors are corrected by setting saturation at high levels for Y (yellow) and R (red), the sharpness intensity is set at slightly low, the amount of UCR is set small as the percentage of dots on black print to reproduce the input color original at high precision. FIG. 8 shows an example of the item ⑥ or the type of user wishes. Users often wish to change the original rather than using it as is inputted. The example shown in FIG. 8 shows options of "light, standard, or dark" of the tone of the finished from which a user can select optionally.

Figure 9:
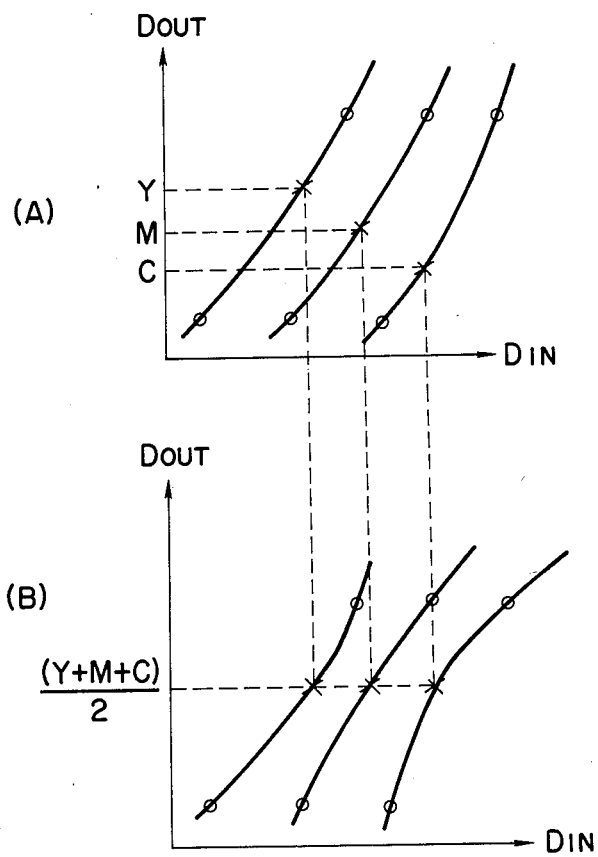
FIG. 9 is graphs to show an example of designating gray point coordinates.

In characteristic point input parameters, density on the points characteristic to the input original are measured and inputted, and at the same time the coordinates of the positions of such characteristic points are inputted from the digitizer 14. The characteristic point density is calculated from the coordinates of the positions which are designated for prescanned data in characteristic density calculation/processing. First, the high-light density and the shadow density are determined preferentially from the figures which are automatically set with the cumulative histogram obtained from the pre-scanned data. This is especially effective for the originals having catch-light points. FIGS. 9A and 9B show examples the item ⑨, setting the coordinates of gray points. FIG. 9A illustrates the relation between input and output of the density signals obtained by pre-scanning for respective colors. If a gray point is not designated, FIG. 9A will remain unchanged, but if a gray point is designated, the designated point will be finished as neutral gray by setting the intensity of the output density signal at one third of (Y+M+C). This is remarkably effective for retouching a color fogged original. The item ⑩, setting the coordinates of skin color points, bears extreme importance as the reproduction of the skin color points often determines quality of the finish when the color original is of a person(s). It is therefore necessary to set the gradation and the color correction in such a way that the coordinates designated by the digitizer 14 may be nicely finished in respect of the skin color. In color designated point coordinates ⑪, it is necessary to set the gradation and the color correction so that the coordinates designated may be finished at designated density (or at percentage of dots). By doing these setting, characteristic points should be reproduced faithfully.

All of the above mentioned auxiliary input parameters can be inputted from the digitizer 14, the graphic display 15 and the console 16 and the gradation calculation/processing, the characteristic point density calculation/processing, the color correction calculation/processing and the cumulative histogram calculation/processing can be conducted by the system comprising the computer 13 and the micro-processor 12 to run their programs. Anyone can set or operate these systems after a simple training but without special skill.

Figure 12:
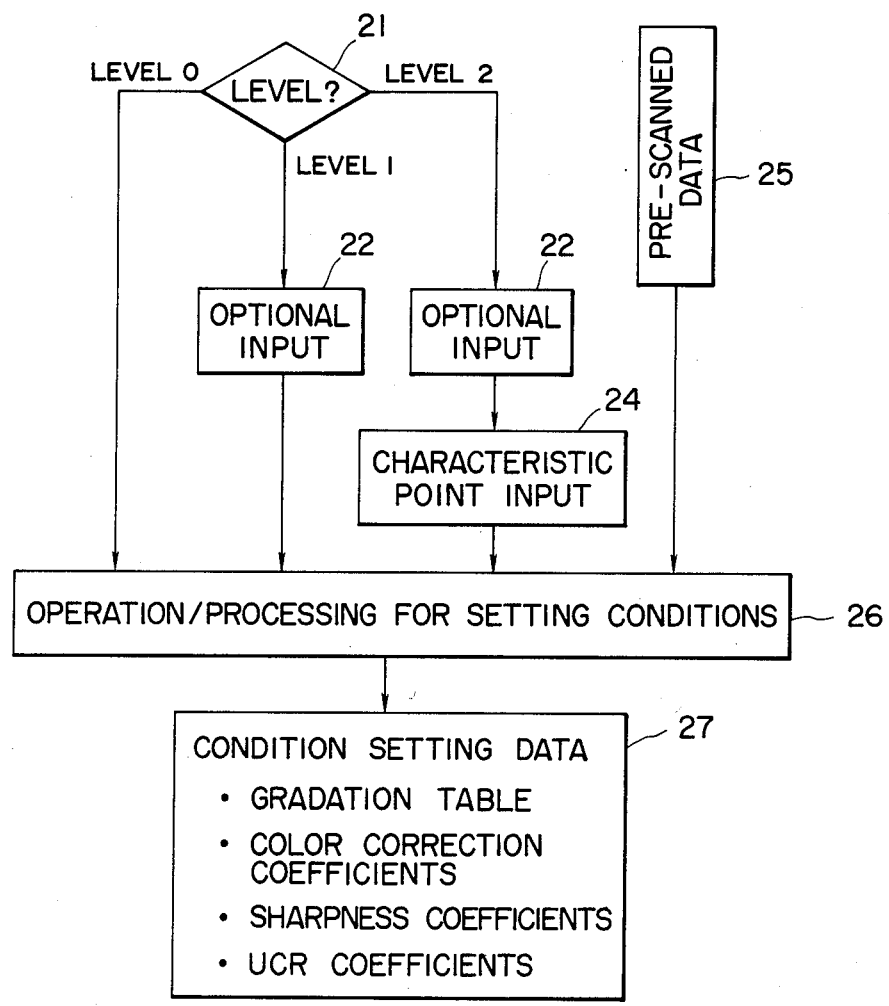
FIG. 12 is a flow chart in selecting a level.

Extremely precise output images can be obtained by utilizing all of the auxiliary input parameters, but some of them may be commited in the following manner depending on the type of original in order to enhance the productivity. FIG. 10 shows an example where input parameters are classified into three; i.e. level 0, level 1 and level 2, and one of the levels is selected depending on the characteristics of an input color original. For example, level 0 corresponds to the original of normal tone where no optional or characteristic point parameters are inputted. At the level 1, only optional input parameters are set while at the level 2 both types of the parameters are set. FIG. 11 shows the result of the relation between the quality in output images and the productivity. At the level 0, the quality is ordinary but the productivity is quite high. At the level 2, the quality is remarkably high but the productivity ordinary. FIG. 12 is a flow chart for determining the level. After a level is selected for an original, the original of level 0 is sent directly to an operation/processing 26 for setting the conditions, that of the level 1 is sent to set parameters from an optional input 22, and that of the level 2 is sent to set parameters from both optional input 22 and characteristic point input 24 before reaching the operation/processing 26 for setting the conditions. No matter what level is set, the originals are ultimately processed together with pre-scanned data 25 at the operation/processing stage 26 to finally determine the condition setting data 27. FIG. 13 shows an example of options which are displayed on the screen of CRT display so that users can choose from them. The figure (A) in FIG. 13 relates to questions on the level (21), (B) to questions on items of the optional input (22), and (C) to questions items of the characteristic point input (24).

As stated in the foregoing, this invention automatic setting method of signal processing conditions in an image input/output system can produce image output of high quality without impairing the original tone of the original by setting, if necessary, auxiliary input parameters for each original. By using this invention method, users can avoid normal tone output images regardless of the original tone. This invention method uses a dialogue type setting method so that even an unskilled operator without experience can choose appropriate options. This is effective in standardizing and stabilizing the quality of the finished products despite the differences or preferences of the individual operators. Because this invention method allows users to select one level of parameter inputs, users can select a program suited to their particular needs in quality and productivity depending on the types of originals.

It should be understood that many modifications and adaptations of the invention will become apparent to those skilled in the art and it is intended to encompass such obvious modifications and changes in the scope of the claims appended hereto.

What is claimed is:

1. A method for automatically setting signal processing conditions for respective colors in an image input/output system where a color original is read for color separation by an image input device, input density signals from the input device are inputted to a signal processing section to be processed in gradation for each color, and then the processed density signals are inputted to an image output device, wherein conditions of said original in the form of optional parameters are selected from a set of options and characteristic point parameters which are selected by designating characteristic points on the original to be processed are selected as auxiliary input parameters, and pre-scanned data from said image input device is processed together with said auxiliary input parameters, so as to thereby determine processing conditions for respective color output density signals.

2. A method for automatically setting signal processing conditions to an image input/output system as claimed in claim 1, wherein said auxiliary input parameters have present levels, a level being selected for the original.

3. A method for automatically setting signal processing conditions in an image input/output system as claimed in claim 1, wherein said optional parameters are the tone of said original, the exposure of said original, presence/absence of high-light points, presence/absence of shadow points, types of picture patterns and user preferred finish.

4. A method for automatically setting signal processing conditions in an image input/output system as claimed in claim 1, wherein said characteristic point parameters are the coordinates of high-light points, the coordinates of shadow points, the coordinates of gray points, the coordinates of skin color points, and the coordinates of color designated points.

5. A method for automatically setting signal processing conditions in an image input/output system as claimed in claim 1, wherein said pre-scanned data is processed by preparing cumulative histograms of pixel data.

6. A method for automatically setting signal processing conditions in an image input/output system as claimed in claim 1, wherein said pre-scanned data and said characteristic point parameters are used to obtain the density of the characteristic points.

7. A method for automatically setting signal processing conditions in an image input/output system as claimed in claim 6, wherein color correction coefficients are calculated from said characteristic point density for use as an output parameter.

8. A method for automatically setting signal processing conditions in an image input/output system as claimed in claim 1, wherein sharpness coefficients are used as output parameters based upon said optional input parameters.

9. A method for automatically setting signal processing conditions in an image input/output system as claimed in claim 1, wherein cumulative histograms of pixel data are prepared based upon said pre-scanned data, characteristic point density is obtained based upon said pre-scanned data and said characteristic point parameters, and gradation is calculated based upon said cumulative histograms, said optional input parameters and said characteristic point density to use a gradation tables as output parameters.

10. A method for automatically setting signal processing conditions in an image input/output system as claimed in claim 9, wherein sharpness coefficients are further determined based upon said optional input parameters.

11. A method for automatically setting signal processing conditions in an image input/output system as claimed in claim 10, wherein color correction coefficients are determined from said characteristic point density.

* * * * *